(12) United States Patent
Varadan et al.

(10) Patent No.: US 11,619,606 B2
(45) Date of Patent: Apr. 4, 2023

(54) METHODS, PROCESSES, AND APPARATUS FOR DEPOSITING NANOSENSORS ON LOW SURFACE ENERGY SUBSTRATES

(71) Applicant: NANOWEAR INC., Brooklyn, NY (US)

(72) Inventors: Vijay Varadan, State College, PA (US); Pratyush Rai, State College, PA (US); Gyanesh Mathur, State College, PA (US)

(73) Assignee: NANOWEAR INC., Brooklyn, NY (US)

( * ) Notice: Subject to any disclaimer, the term of this patent is extended or adjusted under 35 U.S.C. 154(b) by 0 days.

(21) Appl. No.: 17/327,114

(22) Filed: May 21, 2021

(65) Prior Publication Data

US 2021/0278366 A1    Sep. 9, 2021

Related U.S. Application Data

(63) Continuation of application No. 16/136,424, filed on Sep. 20, 2018, now Pat. No. 11,041,825.

(60) Provisional application No. 62/561,381, filed on Sep. 21, 2017.

(51) Int. Cl.
*G01N 27/416* (2006.01)
*G01N 27/414* (2006.01)
*G01N 27/12* (2006.01)
*G01N 27/327* (2006.01)
*H05H 1/38* (2006.01)
*B82Y 15/00* (2011.01)

(52) U.S. Cl.
CPC .......... *G01N 27/4146* (2013.01); *B82Y 15/00* (2013.01); *G01N 27/128* (2013.01); *G01N 27/327* (2013.01); *H05H 1/38* (2013.01)

(58) Field of Classification Search
CPC .................................................. G01N 27/4146
See application file for complete search history.

(56) References Cited

U.S. PATENT DOCUMENTS

| | | | |
|---|---|---|---|
| 11,041,825 B2 * | 6/2021 | Varadan | G01N 27/4146 |
| 2004/0194223 A1 | 10/2004 | Cernak | |
| 2007/0134483 A1 | 6/2007 | Bohringer et al. | |
| 2008/0003399 A1 | 1/2008 | Abrams | |
| 2015/0090288 A1 | 4/2015 | Chudzik | |
| 2017/0225447 A1 | 8/2017 | Varadan et al. | |

* cited by examiner

*Primary Examiner* — Jeffry H Aftergut
(74) *Attorney, Agent, or Firm* — Davidson, Davidson & Kappel, LLC (57) ABSTRACT

A system and method is provided for depositing nanosensors including directing a plasma stream onto a low energy substrate having a surface energy of from 10 mN/m to 43 mN/m to increase the surface energy of the substrate to from 44 mN/m to 80 mN/m, applying an adhesive layer to the plasma discharge treated substrate; and depositing nanosensors on the adhesive coated substrate of step (b) via electrostatic force assisted deposition using a high strength electrostatic field of from 2 kV/cm to 10 kV/cm to form vertically standing nanosensors.

40 Claims, 6 Drawing Sheets

METHODS, PROCESSES, AND APPARATUS FOR DEPOSITING NANOSENSORS ON LOW SURFACE ENERGY SUBSTRATES

This application is a continuation of U.S. application Ser. No. 16/136,424, filed Sep. 20, 2018, which claims the benefit of U.S. Provisional Patent Application No. 62/561,381 filed Sep. 21, 2017, the disclosures of which are hereby incorporated by reference in their entirety.

FIELD OF INVENTION

This present invention relates to a method for depositing nanosensors on low surface energy materials. More specifically, the invention relates to site specific modification of low energy material substrates. More particularly, modification of low surface energy material substrates, herein, refers to increasing the surface energy of the materials. This invention also discloses methods to deposit nanostructures on the low surface energy material substrates.

BACKGROUND

The growing demand for sophistication in the healthcare industry is one of the major drivers contributing to the growth of the global nanosensors market. With technological advances in the healthcare industry, the demand for precision diagnostics is increasing. The demand for speedy and precise detection and diagnostics is compelling the adoption of nanosensors in diagnostic equipment. In 2016, the healthcare segment was the largest end-user segment in the global nanosensors market and will maintain its dominance during the forecast period. Nanosensors provide increased reliability in a compact size and are much more cost effective as compared with their larger counterparts. Technological advances in the healthcare industry have led to an increase in the demand for compact and portable diagnostic sensing systems that can read the vital statistics accurately and quickly. A number of diseases and medical conditions that are tough to diagnose through conventional diagnostics methods can be diagnosed efficiently with the use of nanosensors. The primary factors that drive the application of nanosensors in healthcare are their compact size, speedy, and accurate measurement capabilities. See *Global nanosensors market* 2017-2021, www.technvio.com.

Low surface energy (LSE) materials are designated to have the surface energy of less than 45 mN/m, which results in weak interaction with adhesive ink and coating materials. LSE materials are mostly used as non-fouling, anti-icing, anti-bacterial, anti-reflecting, and anti-staining surfaces for application in invasive and non-invasive medical devices, and consumer products such as automobile coatings, portable electronics, cell phones, touch screens and displays, space technology, energy storage and energy generation devices etc. Nanosensor deposition on these non-fouling surfaces gives an opportunity for extending the ability of high fidelity sensing to these applications.

The nanosensors can be flexible in nature so that they can be deposited on LSE material surface of different flexibility and shape. The nanosensor includes freestanding nanofibers attached to the substrate with a cured adhesive ink layer and the freestanding nanofibers coated/functionalized with a film. The film may be a specific to the intended function of these nanosensors, such as metal for electrically conductive sensors, metal oxide for capacitive and piezoelectric sensors, polymer based for conductive or semi-conductive sensors, biomolecules for metabolite detection.

Adhesion of adhesive ink layer to these LSE material surfaces is important for nanosensor deposition process. The surface energies of the LSE materials and that of the adhesive films or inks should be matched to ensure proper wettability and bonding. For this, the surface energy of the LSE material should be increased to match the required surface energy of a particular adhesive. Surface treatment of LSE materials has been in practice to make them compatible with coating process.

A number of surface treatment processes have been proposed for LSE materials. In particular, a chemical activation treatment has been described in U.S. Pat. No. 7,368,163, incorporated by reference, in which chemical activation is provided using polyethylene glycol, $H_2PtCl_2$ as catalyst at 80° C. for 30 to 150 minutes. Another treatment described in U.S. Pat. No. 5,922,161, incorporated by reference, provides a process in which a polymer surface is oxidized by corona discharge, in particular, corona discharge of 10-80 $mJ/mm^2$ using $O_2$, $O_3$, $CO_2$, He, Ar gases, plasma discharge 20-60 watts for 1-60 seconds, flame treatment with 0.8-2% $O_2$ with conveyor speed of 10-100 m/minute. A plasma treatment for polymer implants has been proposed in U.S. Pat. No. 5,804,263, incorporated by reference, in which plasma discharge of ~25 Watts for 2 minutes is followed by Gamma radiation (radiation dose of $10$-$10^8$ rads/min). Surface treatment of molding made of fluoro polymers has been proposed in U.S. Pat. No. 4,064,030, incorporated by reference, in which sputter etching under vacuum 0.0005-0.15 Torr and discharge power of 0.1-5 Watts/$cm^2$ under Ar or $N_2$ environment is provided. Surface modification of implants made of ePTFE has been proposed in U.S. Pat. No. 7,597,924 B2, incorporated by reference, in which low energy plasma is applied using RF power of 13.56 MHz or 2.45 GHz and 50-400 Watts under pressure of 0.1-10 Pa, with $N_2$, $O_2$, and Ar gases used for plasma discharge.

Plasma treatment processes have a small number of byproducts because they mainly use inert gases.

SUMMARY OF INVENTION

In accordance with a first embodiment of the present invention, a method for depositing nanosensors is provided comprising: (a) directing a plasma stream onto a low energy substrate having a surface energy of from 10 mN/m to 43 mN/m to increase the surface energy of the substrate to from 44 mN/m to 80 mN/m; (b) applying an adhesive layer to the plasma discharge treated substrate of step (a); and (c) depositing nanosensors on the adhesive coated substrate of step (b) via electrostatic force assisted deposition using a high strength electrostatic field of from 2 kV/cm to 10 kV/cm to form vertically standing nanosensors.

In accordance with a second embodiment of the present invention, an apparatus for depositing nanosensors is provided comprising: a plasma energy treatment station to increase the surface energy of a low surface energy substrate having surface energy less than 45 mN/m to a range of 45 mN/m-80 mN/m, the plasma energy treatment station including a plasma generator including a nozzle to direct the plasma stream to impinge a plasma jet on the low surface energy substrate, a heating element to heat the low surface energy substrate, a thermocouple to measure the temperature, and an AFM probe to measure the surface energy on the low surface energy substrate. The apparatus further includes a screen printing station located downstream of the plasma energy treatment station, the screen printing station configured to apply an adhesive layer on the plasma discharge treated substrate; and a flocking station to electrostatically drive the nanosensors on to the adhesive layer of the substrate. This arrangement may also be used to perform the process of the first embodiment described above.

DETAILED DESCRIPTION OF THE PREFERRED EMBODIMENTS

Nanosensors have large sensor surface area, which results in low skin-electrode contact resistance. Thus, it helps in increasing the sensitivity of sensor electrodes. Typically, the nanostructures are deposited on substrate and the whole medium acts as sensors or electrodes. Surface adhesion of flock adhesive is important for the nanocomposite fiber deposition on non-polar substrates. Adhesion is largely dependent on surface interaction between adhesive and substrate, wherein, the adhesive must be able to flow out (wet) and interact with the surface of the substrate. In order to have proper flow and achieve complete wetting of the substrate the following parameters such as composition of the surface, its texture, porosity, and any surface modifications should be optimized. Also, fouling due to contamination, chemical reaction, occluded gases can affect the adhesion and should be minimized. Wetting is also dependent on adhesive viscosity and temperature which should also be considered.

Even when the substrate surface has been cleaned of barrier film and contaminants, the surface may resist being wetted by an adhesive. This is because of surface energy. Surface energy is the excess energy that exists at the surface (as opposed to the bulk) of a solid. This excess interaction energy is because of molecules at the surface that are not able to interact with as many like neighbors as molecules in the bulk. The surface energy of the surface varies with its chemical make-up. Higher surface energy results in greater molecular attraction. Low surface energy results in weaker molecular attraction. Note that metals and glass have a high surface energy and are easier to bond, whereas plastics and certain metal alloys have a low surface energy and are harder to bond. Hardest of all are the low surface energy (LSE) plastics. Surface energy values of well known LSE materials have been listed in Table 1:

TABLE 1

Exemplary Low surface energy substrates

| Substrate | Surface energy (mN/) |
| --- | --- |
| Poly-tetra fluoro ethylene (PTFE) | 18 |
| Silicone | 24 |
| Polypropylene | 30 |
| Polyethylene | 32 |
| Polystyrene | 34 |
| Polycarbonate | 34 |
| Poly (vinyl chloride) (PVC) | 39 |
| Nylon-6,6 | 43 |
| Poly (ethylene terephthalate) (PET) | 43 |
| Poly (vinylidene fluoride) | 25 |
| Polyurethane | 34 |
| Acrylonitrile butadiene styrene (ABS) | 34 |
| Stainless steel 304L | 18.7 |
| Nickel Titanium alloy | 26 |

There are two ways to achieve adhesion to LSE surfaces, one is to use low surface energy adhesives such as acrylic adhesives that can bond to LSE surfaces and the other is to activate the surface by using surface modification techniques to change the chemical composition of LSE surface to increase the surface energy. The surface modification techniques include corona, plasma or flame treatment, acid etching or solvent based adhesion promoters containing higher surface energy resins which entangle with the LSE surface when the solvent swells the surface. These processes aim to bring the surface energy of the LSE materials to the required surface energy of the adhesive being used. Required surface energy ranges for different adhesive types have been given in Table 2:

TABLE 2

Surface energy needed for adhesion

| Adhesive | Surface energy (mN/m) |
| --- | --- |
| UV ink | 48-56 |
| Water based ink | 50-56 |
| Non-polar Coating | 46-52 |
| UV glue | 44-50 |
| Water based glue | 48-56 |
| Solvent based ink | 30-60 |

The process described according to embodiments of the present invention is designed for plasma discharge treatment for LSE surfaces to achieve specified surface energy and activate them for nanosensor deposition. The process also allows for controlled plasma treatment based on surface energy measurement as a feedback. The process has the ability to focus treatment at specific locations so that nanosensors can be deposited at the activated site, while leaving other areas with the LSE properties.

Figure 1A:
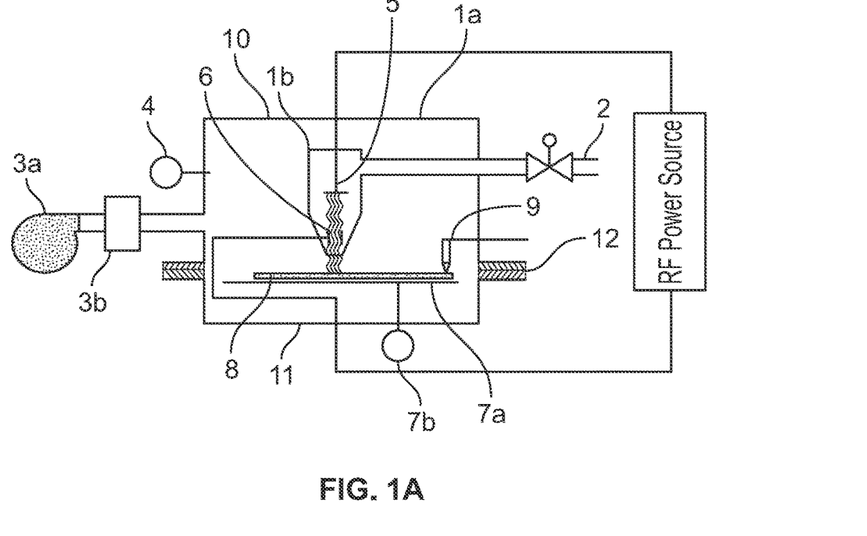
FIG. 1(a) shows a system including a process chamber for surface activation in preparation for nanosensor deposition.

The process of surface activation is shown in FIG. 1(a). For the purpose of obtaining activated surface at the location (s) on the sample intended for nanosensor placement, the plasma treatment is done in a chamber 1a with a controlled environment. In order to perform surface activation in a selected region, the process chamber 1a is fitted with a movable plasma generator 1b producing a plasma corona 17 that is the size of the desired nanosensor pattern or smaller as shown in FIG. 1(a). The chamber is filled with gas 2 that is used to create plasma as well as act as a purge gas. The pressure in the process chamber is controlled by a vacuum pump 3a and cold trap 3b and pressure gauge 4. The gas is injected through the plasma generator 1b into the chamber 1a. An exemplary process chamber 1a can be assembled by integrating the following components and equipment: (i) Vacuum pump (Edwards RV8 Vacuum Pump) with cold trap (Welch 1420H-14 Foreline dry ice cold trap from Cole Parmer); (ii) Plasma generator and RF energy source (Inline Atmospheric Plasma System from Plasma Etch, MKS Instruments Inc. Microwave Plasma Generator); (iii) AFM probe such as Keysight 5500 AFM or Keysight Nano Indenter G200; (iv) regarding the gas, the plasma gas can be oxygen, argon, nitrogen, helium, oxygen-argon mixture and the purge gas can be nitrogen or argon, for example.

The substrates for depositing nanostructures include, but not limited to, Polyolefins such as LDPE (low-density polyethylene), LLDPE (linear low-density polyethylene), HDPE (high-density polyethylene), PP (polypropylene), PB (polybutylene); polyamides such as Nylon6, Nylon6,6, Nylon6,10, Nylon6,11, Kevlar; polyesters such as PBT (Polybutylene terephthalate), PET (polyethylene terephthalate), PEN (Polyethylene naphthalate); acrylics such as PMA (polymethacrylate), PMMA (polymethyl methacrylate), PEMA (polyethyl methacrylate); polyurethanes based on polyether and polyester polyols and aromatic and aliphatic isocyanates; vinyl polymers such as PVC (polyvinyl chloride), EVA (ethylene-vinyl acetate), PVA (Polyvinyl alcohol), PVDC (polyvinyledene chloride); styrene and copolymers such as PS (polystyrene), ABS (Acrylonitrile butadiene styrene), (Styrene-acrylonitrile resin) SAN; fluoropolymer such as PTFE (Polytetrafluoroethylene), PVDF (polyvinylidene fluoride); silicones such as polysiloxanes, RTV (Room-Temperature-Vulcanization silicone); engineering Polymers such as PEEK (polyether ether ketone), PEK (polyetherketones), PSU (polysulfones), LCP (liquid-crystal polymer); elastomers such as natural rubber, polyisoprene, butyl rubber, polybutadiene, SBR, polychloroprene; Interpenetrating Polymeric Networks (IPN's); stainless steel 304L; and nickel titanium alloy.

The plasma discharge is created by applying voltage between the electrode or filament 5 and the counter electrode/filament 6. The plasma stream is directed out of the nozzle of the plasma generation setup in form of a plasma jet. The plasma jet is directed towards the platform 7a for the sample 8. The platform 7a is kept at a set temperature to heat the sample 8 by heating element and thermocouple sensor 7b. The set temperature may, for example, range from 25-200° C. for polymers depending on the melting temperature of the polymer substrate. As an illustration, a set temperature of 60-80° C. can be used for polystyrene. For non-polymeric substrates, melting temperature is not a factor and process temperature can be set based on process requirements, such as for stainless steel the temperature can be set at 25° C.

The applied power and duration is dependent on the type of sample. For example, for Polysulphone substrate using inert gas plasma, 5-15 W at 13.56 MHz for 1-50 minutes may be used, for polystyrene substrate using inert gas plasma, 40 W at 40 kHz for 1-50 minutes and for stainless steel 304L using argon gas plasma at atmospheric pressure, 10-200 W at 2.45 GHz for 1-50 minutes. The process chamber 1a also has a surface energy measurement probe 9 that measures surface energy of the sample surface at a given point in real time. It can move to specified location of the sample surface and measure surface energy. The chamber 1a is designed as top and bottom halves 10,11 that detach to allow for placement of the sample 8. Once the sample has moved in, the halves re-attach. The gasket 12 helps maintain the pressure and gas environment inside the chamber 1a.

Once the process is done, the chamber halves 10,11 are separated and the sample is moved out of the chamber 1a.

The sample moving mechanism can be a robotic arm that moves individual samples or the sample can be provided in the form of a continuous roll which is moved through the chamber 1a stepwise, so that each section of the roll is sequentially processed.

Figure 2:
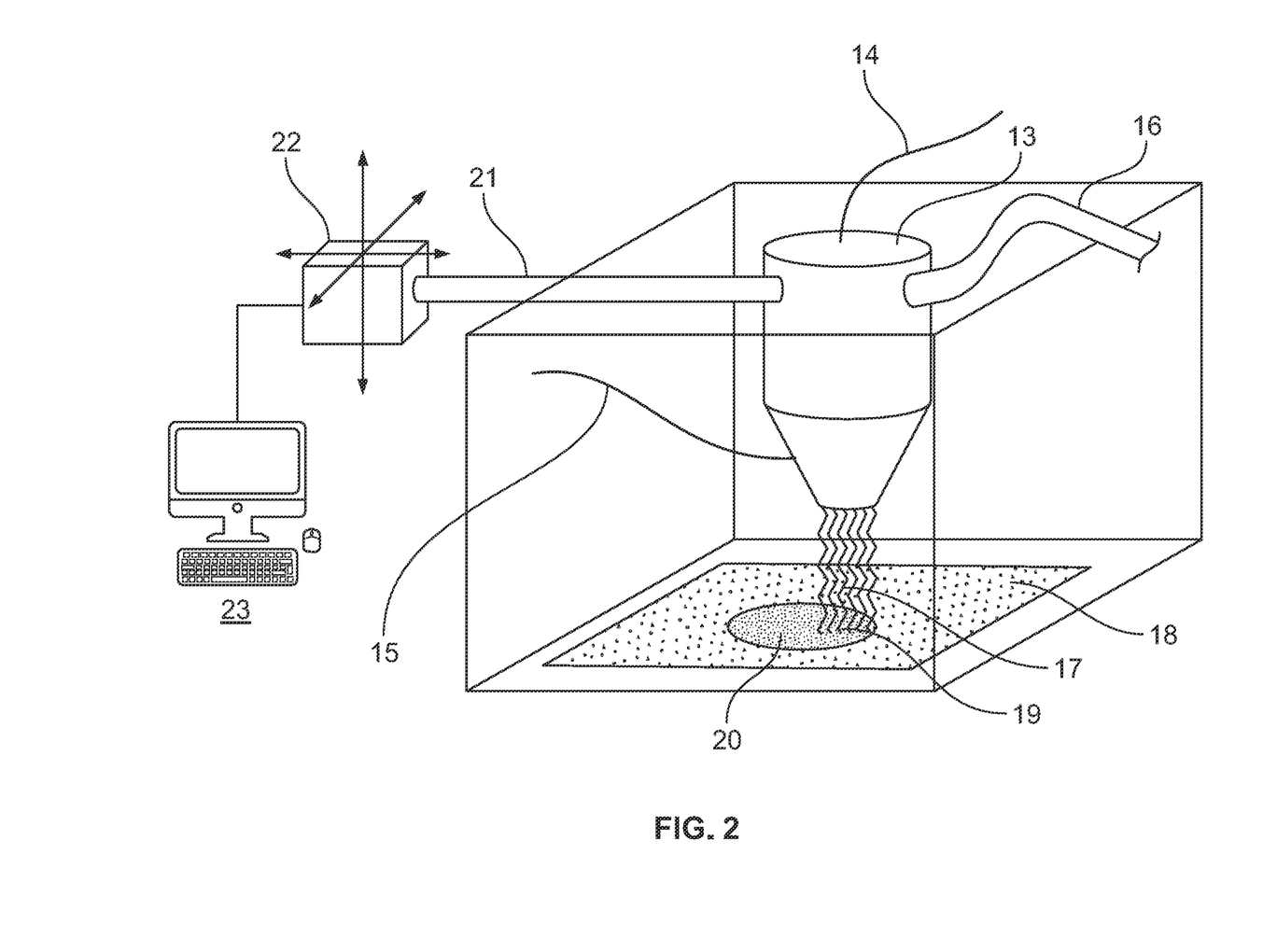
FIG. 2 shows a closed loop control system for a plasma generator in the process chamber for surface activation in preparation for nanosensor deposition.

The movable plasma generator 1b is controlled by a 3-axis platform and stepper motor system 22 (Gantry Systems from PhysikInstrument) controlled by a computer as shown in FIG. 2. The plasma generator 1b has a nozzle 13 that also houses the electrode 5 and counter electrode/filament 6. It has a gas inlet line 16 that pumps gas 2 into the nozzle 13. The plasma stream is created within the nozzle 13 and flows out as a plasma jet 17. The plasma jet is directed at the sample 18 placed directly underneath the nozzle. The area being treated at a particular instance is of the size of the plasma jet glow 19 on the sample 18, where most intense processing happens in the core region of the glow. The distance between the nozzle outlet and the sample surface (30-100 mm) determines the size of the core region. At a given instance, the nozzle covers an area that is equal to or less than the intended nanosensor footprint/pattern 20. The nozzle is sequentially moved around to cover the entire footprint 20. The nozzle 13 is attached to an arm 21 that is mounted on a movable 3 axis platform and stepper motor system 22, such that the nozzle 13 follows the movements of the platform 22. The platform and stepper motor system 22 is controlled by a computer 23 with control software (C, C++, Visual basic based program) as is known in the art.

The surface energy measurement probe 9 is an Atomic Force Microscopy (AFM) probe that measures surface force of attraction and adhesion between the AFM tip and sample surface. The AFM probe is part of a conventional AFM apparatus, including processing software and hardware, as is known in the art, which may be part of computer 23. The surface force of attraction and adhesion are normalized by the radius of AFM tip to calculate respective force indices which are directly correlated to the surface energy of the sample surface. For example, untreated PTFE surface (surface energy of 18 mJ/m$^2$) has normalized attractive force of 0.06 mJ/m$^2$ and normalized adhesive force of 0.16 mJ/m$^2$ for a tungsten AFM tip with a radius of 2.5 μm.

The AFM tip is a double cross or a double beam cantilever with known beam spring constant which constraints the motion of the tip to the z direction, which is normal to the sample surface. The tip material can be made of materials such as tungsten. The measurement is done in a clean and gas purged environment such as that found in process chamber 1a. For calibration purposes, the sample surface energy is first calculated by the contact angle measurement method and then the AFM is used for adhesion force to establish correlation. The sample surface should be cleaned, to remove any contaminants, and should be in the physicochemical state as intended for the actual process (e.g. oxidized, un-oxidized, polished to a specific roughness).

The AFM measurement starts with the sample far away (e.g., 10 microns or more along the z axis/normal axis) and the cantilever in resting position (where the cantilever is at zero deflection). The sample is moved towards the tip and the cantilever is measured for cantilever deflection by the AFM apparatus. The sample is brought towards the tip until the maximum permissible deflection of the cantilever |Δz| is achieved (maximum permissible deflection is programmed in to the process control program). For example, when a cantilever deflection measurement corresponding to 100 nN is achieved, the sample surface movement towards the tip is stopped. The sample is now moved in reverse direction such that it moves away from the cantilever-tip. The cantilever is moved in reverse direction to the point where the tip and the sample surface separate. In this regard, the AFM tip 9 approach starts from a distance of more than 10 microns. The AFM tip 9 retraction can be as far as 5 microns. The distance can be varied based on the surface roughness or if the sample 8 has three dimensional features. The tip approach distance can be increased for initial tip approach to allow for sample to be brought into the process chamber 10. The approach and retraction distances can be kept short to allow for fast scanning and high throughput.

Figure 5:
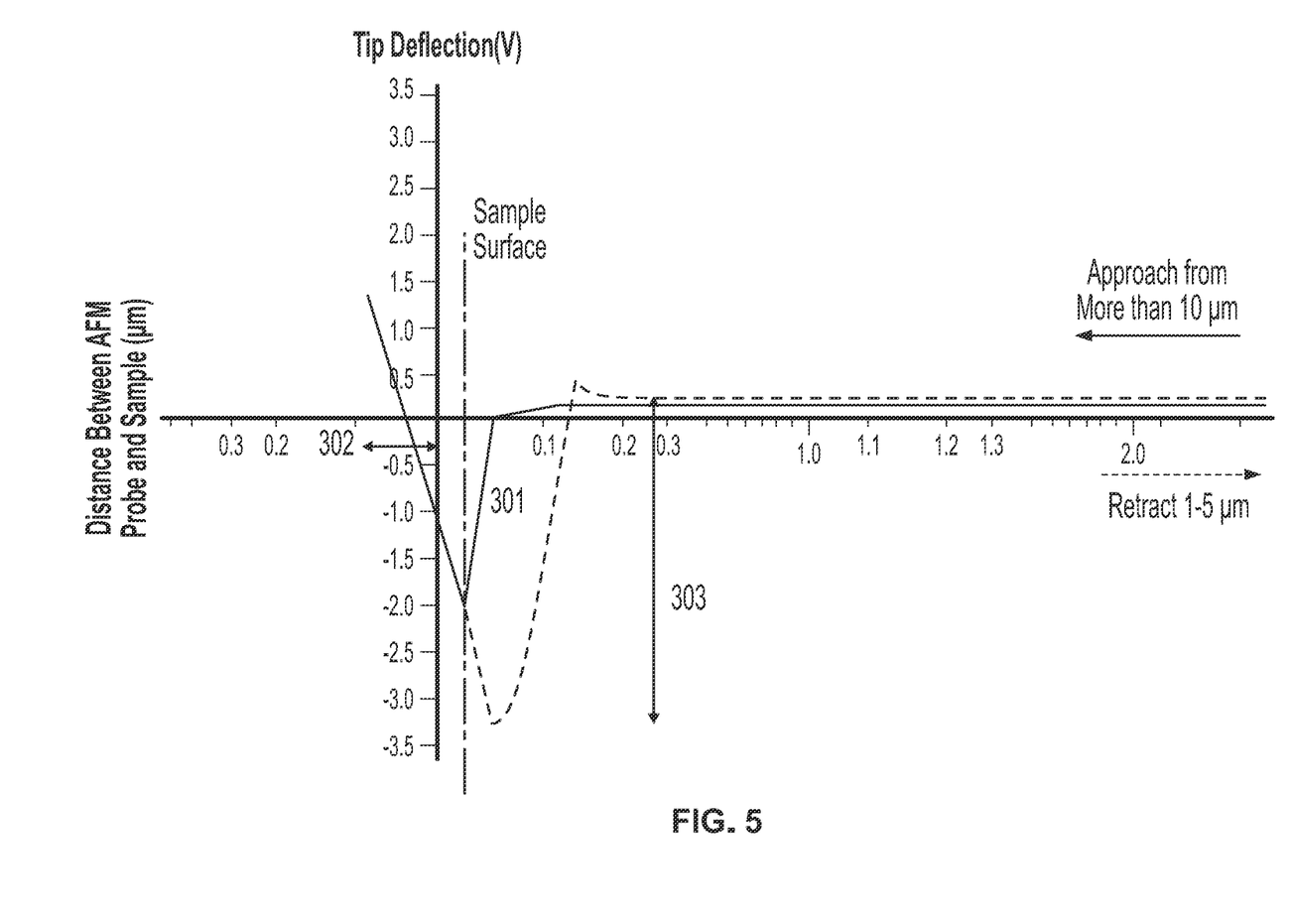
FIG. 5 shows an exemplary plot of approach and retract curves for measurement of attractive force, plotting the AFM tip's deflection during the AFM tip's approach to the surface of a sample and retraction

As discussed above, the cantilever is moved in reverse direction to the point where the tip and the sample surface separate. This is detected by a notable sudden movement of the cantilever away from the sample (as shown in FIG. 5). Referring to FIG. 5, the cantilever deflection $|\Delta z|$ (303) at that point, during the above sample retraction procedure, is multiplied by the cantilever spring constant (spring constant value provided by AFM tip manufacturer for example Microlever from Veeco) to calculate the adhesive force or the attractive force between the AFM tip and the sample surface.

For calibration purposes the attractive and adhesive force measurements were repeated 10 times at each specified location on the sample surface, thereby obtaining a global average as well as a force map of the sample surface. The force values are then correlated to the surface energy values previously calculated by contact angle method. Since the applied forces are of the order of nN, there is no systemic effect of the underlying surfaces (in case of a laminated sample) or the bulk elastic modulus of the sample itself. Only the coatings on top of the sample surface and the type of gas used to purge the process chamber 1a have any effect on the force measurements. By construction and instrumentation, the AFM probe can do measurement at any specified location on sample surface during the plasma assisted surface activation process. This provides an indicator for when required surface energy has been achieved during the plasma treatment process.

Figure 4A:
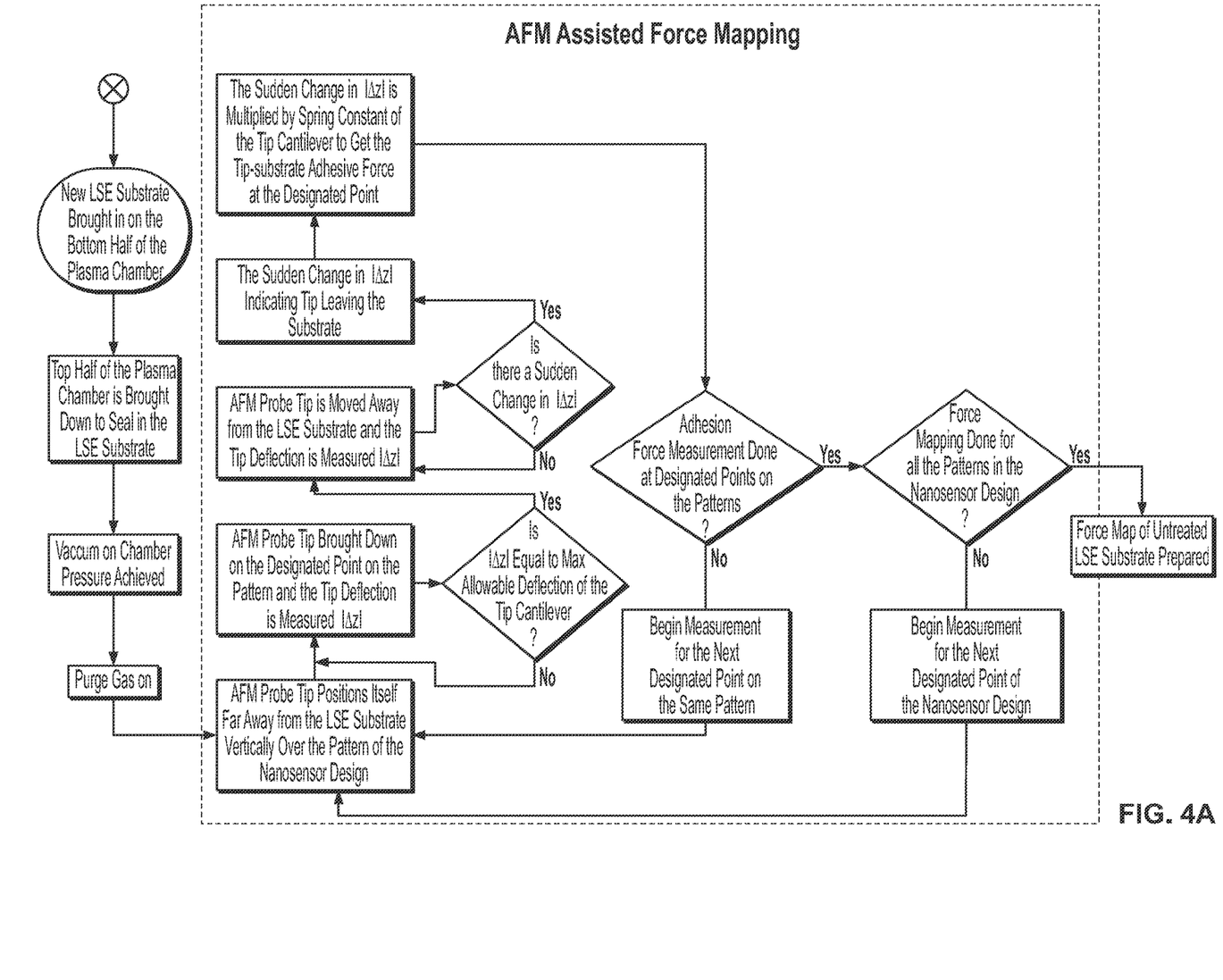
FIG. 4(a) is a first flowchart for the closed loop control system of FIG. 2.
Figure 4B:
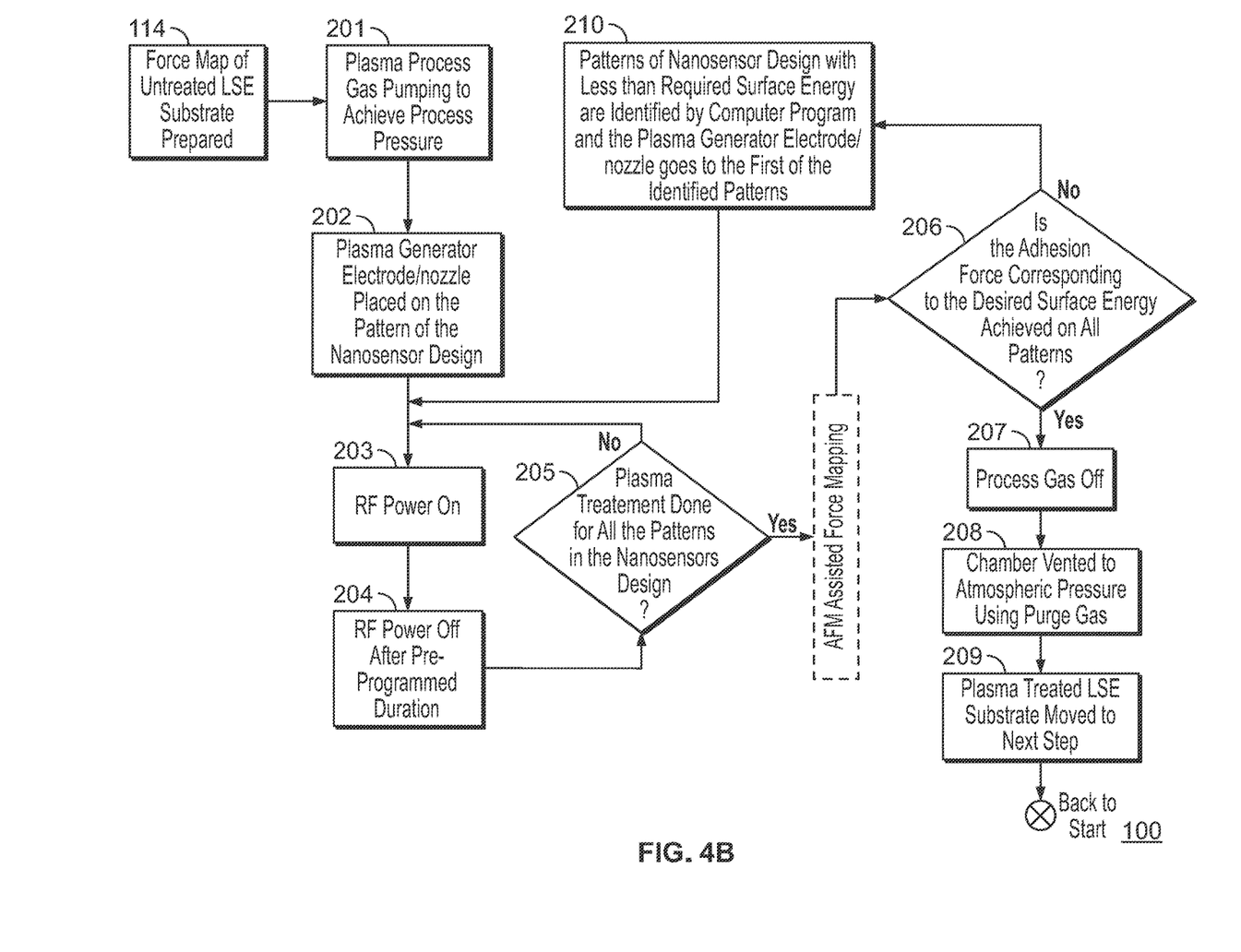
FIG. 4(b) is a second flowchart for the closed loop control system of FIG. 2.

An exemplary plasma treatment process to increase surface energy is described in the flow chart shown in FIG. 4(*a*) and FIG. 4(*b*). The process occurs in the chamber 1(*a*) as shown in FIG. 1, with the closed loop control system shown in FIG. 2. The plasma under computer control using the 3-axis controller 22, shown in FIG. 2, is used for surface treatment. The surface energy measurement is done by AFM probe. The data from the AFM probe is used to decide when the required surface energy is achieved.

Referring to FIG. 4(*a*), the process starts (100) and a new LSE substrate is placed on the bottom half of the plasma chamber (101). The top half of the plasma chamber is then brought down to seal the LSE substrate in the chamber (102). The air is pumped out of the camber to achieve vacuum (103), and then the purge gas 2 is applied to the plasma chamber through the nozzle 13 (104). The AFM probe for surface energy measurement is mounted on a stage that can move in the x and y direction to cover the entire substrate. The AFM probe tip is positioned far away (e.g. 10 microns or more as discussed above) from the LSE substrate and vertically over a desired pattern of the nanosensor design (105). The AFM probe tip is then brought down on a designated point on the pattern and the tip deflection is measured $|\Delta_z|$ (106). In this regard, within the pattern, a set of points are specified (x and y coordinates) in the AFM tip computer control. This enables the stage to move the AFM tip over to the specified coordinates and land on the designated points in the pattern. If $|\Delta_z|$ is equal to the maximum allowable deflection of the tip cantilever of the AFM probe tip (107), then the process proceeds to step (108). If not, step (106) is repeated. In step (108), the AFM probe tip is moved incrementally in a direction away from the LSE substrate and the tip deflection is measured $|\Delta_z|$.

If there is a sudden change in $|\Delta_z|$ (109), then this is an indication that the tip has left the substrate (110). In this regard, as shown in FIG. 5, the tip approaches the sample and jumps into contact 301 with the sample surface. The AFM probe continues to move towards the sample surface, adding to the tip deflection, till it reaches maximum deflection 302. Then the tip is retracted away from the sample. The tip maintains contact up to the point when it breaks contact and returns to rest, registering a sudden change in $|\Delta_z|$ 303.

If not, step (108) is repeated and the probe tip is moved another increment in a direction away from the LSE substrate and the tip deflection is measured $|\Delta_z|$. In step (111), $|\Delta_z|$ is multiplied by the spring constant of the tip cantilever of the AFM probe tip to get the tip-substrate adhesive force at the designated point. This process (105-111) is then repeated for all designated points on the pattern (112, 115). For example, it may be desirable to repeat the process for the rest of the points specified in the AFM tip computer control program. Once the adhesion force measurement is done at all designated points of the pattern (112, Yes), this set of measurements is stored as a force map. Then, steps 105-112, 115 are repeated for any remaining patterns on the nanosensor design (113, 116). Once force maps for all of the patterns have been prepared (114), the process moves to FIG. 4(*b*).

Referring to FIG. 4(*b*), plasma process gas is pumped into the nozzle 13 to achieve process pressure in the chamber 1(*b*) (201). The nozzle 13 with electrode is then placed over the pattern of the nanosensor design (202), and the RF power is applied for a pre-selected duration (203, 204). In this regard, the distance between the nozzle and pattern is determined by the plasma intensity. The plasma intensity varies for different gasses and applied RF energy. If the sample is too close to the nozzle, arcing may occur. If the sample if too far from the nozzle, the plasma energy will dissipate and optimal plasma treatment of the surface may not happen. As described above, the power, frequency and duration is selected based on the type of substrate used. The RF power ranges from 5 to 200 W, the frequency ranges from 40 kHz to 2.54 GHz and duration ranges from 1-50 minutes.

As described above, the pattern 20 is larger than the plasma stream 17, so the nozzle 13 is controlled by computer 23 to incrementally apply plasma to the entire pattern (203-205). At this point, the system checks to see if the desired surface energy has been achieved on the pattern. This process involves using the AFM probe and repeating the "AFM assisted force mapping" steps of FIG. 4(*a*). Once the adhesion force is achieved on all patterns of the design (206), the process gas is turned off (207), the chamber vented to atmospheric pressure with purge gas (208), the plasma treated LSE substrate is moved to the next step in the process (209).

Figure 1B:
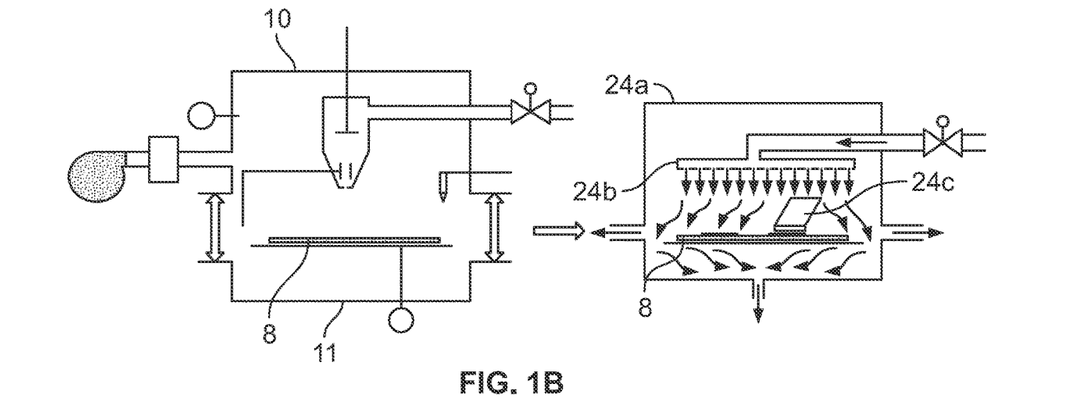
FIG. 1(b) shows the process chamber of FIG. 1(a) in communication with an adhesive layer application apparatus.

In particular, after requisite plasma activation of the low energy substrate, the substrate with the required surface energy is moved for further processing. After completion of plasma treatment, chamber 1a is opened up at point 12 when the upper 10 and lower 11 parts move away. The substrate is brought out under a nitrogen gas curtain 24b (like an air curtain) in a nitrogen purged enclosure 24a that has the apparatus for adhesive layer application as shown in FIG. 1(*b*). Referring to FIG. 1(*b*), the adhesive layer application is done by using a screen printing apparatus 24c, which lays down the adhesive layer in the patterns as per the nanosensor design. After screen printing the adhesive on the activated LSE substrate, the Nitrogen supply is turned off and a flocking process is initiated. Alternatively, if the application of the adhesive layer is performed using spray coating, roto-gravure printing or spin coating, the chamber 24a is modified to accommodate the spray head, the printing drum or spin table for the adhesive application to be done in nitrogen environment.

Figure 3A:
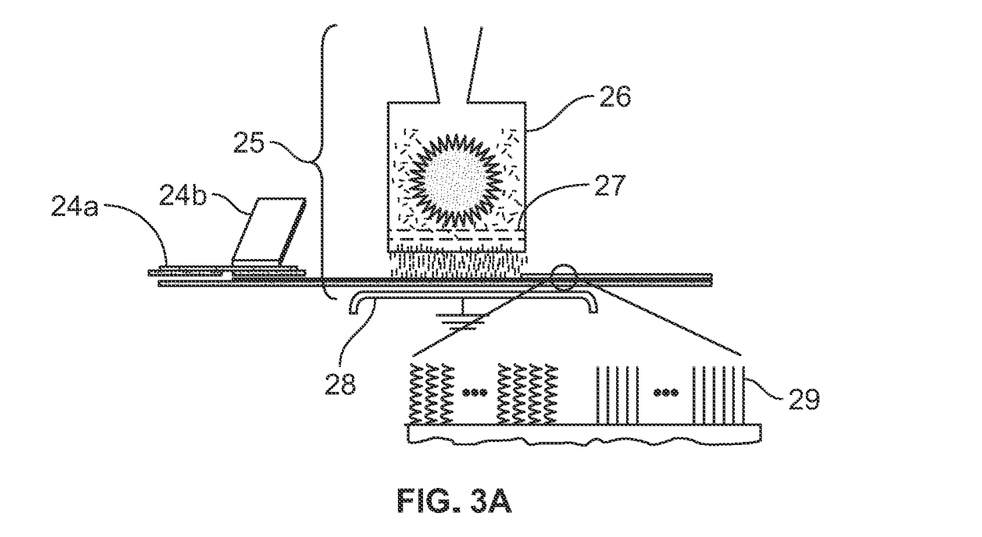
FIG. 3(a) illustrates electrostatic force assisted deposition of the nanostructured fibers driven towards a substrate by an electrostatic field and attached to the adhesive layer in a vertically upright position.
Figure 3B:
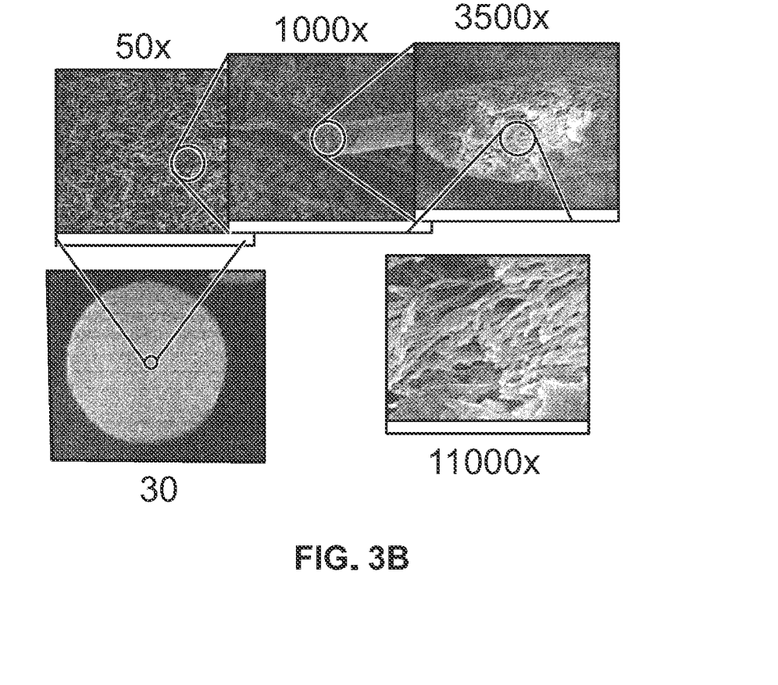
FIG. 3(b) shows a nanosensor on a substrate at increasing magnifications.

The adhesive coated surface is used for nanosensor deposition. FIG. 3(a) illustrates the electrostatic force assisted deposition of the nanostructured fibers driven towards the substrate by electrostatic field and attached to the adhesive layer in vertically upright position. The process is performed by nanostructured fibers deposition using the Flocking Station 25 (for example, M&R Flocker 3000). The flocking station 25 includes a pneumatic applicator 26 (such as a pneumatic cylinder), a positive electrode grid 27 and ground electrode 28 as is known in the art. This provides a pneumatic and/or electrostatic assisted deposition of electrostatically charged fibers 29 with a high strength electrostatic field of, for example, 2 kV/cm-10 kV/cm. Thus, obtaining LSE substrates with nanostructured patterns 30 that can be functionalized for specific applications. FIG. 3(b) shows images of an exemplary of nanosensor deposited on a PTFE substrate at magnifications of 50×, 1000×, 3500× and 11000×. The nanosensor is shown having a circular shape, but different shapes may be desired for specific applications, including but not limited to, oval, oblong, square, rectangle, clover-leaf, etc. The adhesive application can be done by using technique appropriate to the adhesive viscosity, sample geometry and footprint of nanosensors. For example, screen printing/gravure printing can be used for flat samples and high to medium viscosity adhesives, whereas, spray coating can be used for 3 dimensional samples and low viscosity adhesives. Screen printing methods, as well as flocking are described for example, in U.S. 2016/0222539 A1 and 2017/0226643, and gravure and roll-to-roll printing methods as well as flocking are described in U.S. 2017/0225447 and 2018/0080126, the entire disclosures of which are hereby incorporated by reference.

As an example of functionalization for intended use, a process for making the LSE substrates with nanostructured pattern into electrically conductive nanosensors is described. The nanostructured fibers can be coated with conductive film with the help of electroless plating by enmeshing/decorating the nanostructures with conformal conductive thin coating of silver nanoparticles. The detailed description of this process can be found in US 2017/0226643A1, incorporated by reference. The electroplating process is done by a modular electroless plating system with multiple chemical tanks that perform chemical treatment of the previously made nanosensor patterns, which as described above include a nanostructured fiber patterns on the flexible or rigid substrate such as plastic or other substrates. The tanks are glass lined and the dimensions are dependent on the size of substrate being used for deposition. The steps of chemical treatment include (i) a matrix polymer etch on the fiber surface to expose embedded nanostructures, (ii) cleaning the fiber surface, (iii) priming the fiber surface for plating with Sn2+ colloidal bath, (iv) dip coating of fiber surface with silver plating ink, (v) drying of the ink to form silver nanoparticle coating on fibers in nitrogen environment in excess of 60° C., (vi) annealing of the silver film in excess of 100° C. to improve attachment, and (vii) conformal coating of the nanosensor surface with dielectric polymer film such as poly 4-vinyl phenol. Drying of the ink is done in a nitrogen oven with temperature and nitrogen flow control such as a Keen Ovens K-900, annealing is done in a convection oven with temperature control such as a VWR Gravity Convection oven, conformal coating is done with a 3600 spray coating nozzle such as a BETE MicroWhirl nozzle, and curing of the film is done in a convection oven with temperature control such as a VWR Gravity Convection oven.

One challenge is that nano-fibers by themselves cannot penetrate the meniscus of the adhesive on the substrate during a standard electrostatic deposition process (flocking). Also, such small structures are very difficult to handle during deposition and require a closed chamber or vacuum. To solve this problem, two/three component yarn, with polymer nanofibers embedded in a matrix of another polymer, can be used for nanosensor fabrication followed by dissolving of the matrix polymer to expose the nanofibers. The fibers can be cut and flocked like normal micrometer scale (microdenier) fibers and a subsequent dissolving step can release the nanofibers, resulting in vertically free-standing nanostructures on the substrate. Composite fibers are best suited because they can be flocked as micro-denier fibers and then bundled polymer nanofibers can be released by dissolving the matrix polymer.

The free standing nanostructured fibers can be coated with film of conductive material such as silver, gold, platinum, polyaniline, polypyrrole, poly(3,4-ethylenedioxythiophene) to make them electroactive for applications such as but not limited to health monitoring EKG, EEG, EOG, EMG electrode application, touch sensors. They can be coated with metal oxide such as films for capacitive sensing application such as but not limited to respiration rate, air quality, gas sensing, and water quality. They can be coated with piezoelectric material film for application such as but not limited to motion sensing, acoustic transduction, noise dampening, impact sensing. They can be coated with biochemical functional groups for applications such as but not limited to analysis of sweat and detection of metabolites. The coating process may be different for different materials. The process can use techniques such as dip coating, wet or dry spray coating, electroplating, sputtering, vapor deposition. The process temperatures should not exceed the glass transition temperatures of the polymers that constitute the nanostructured fibers.

The embedded nanometer size filament bundles in the encompassing polymer matrix of the micro denier fiber are normally straight linear filaments. However these linear filaments can be converted into helical structure, to increase surface area, by using polymer components such as Polyesters like Polyethylene terephthalate (PET), Polyethylene naphthanate (PEN), Polymethyleneterephathalate (PMT), Polybutylene terephthalate (PBT), Polyurethanes with IPN and semi-IPN structure, Polyamides such as Nylon 6, Nylon 6,6, Nylon 6,10, Styrene copolymers as bi- and tri-component interpenetrating polymeric network (IPN) which are initially in form of helices by controlling the molecularly bonded hard segments such as poly-isocyanate and soft segments such as polyether based polyol of the polyurethane filaments. They can be converted into linear filaments and nanobundles during melt extrusion, by thermal and mechanical stress, through the spinneret to make the two/three component yarn. Subsequently, the filaments can be converted back to helical form by a thermal stimulus as required by the IPN, which are either embedded in the micro denier yarn or released as free-standing nanostructures after dissolving the matrix polymer. The spinneret and the cooling zone can be modified for this helix based two/three component yarn.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

Obvious variants of the disclosed embodiments are within the scope of the description and the claims that follow.

All references cited herein, as well as text appearing in the figures and tables, are hereby incorporated by reference in their entirety for all purposes to the same extent as if each were so individually denoted.

What is claimed is:

1. A method for depositing nanosensors comprising:
   (a) directing a plasma stream onto a low energy substrate having a surface energy of from 10 mN/m to 43 mN/m to increase the surface energy of the substrate to from 44 mN/m to 80 mN/m;
   (b) applying an adhesive layer to the plasma discharge treated substrate of step (a); and
   (c) depositing nanosensors on the adhesive coated substrate of step (b) via electrostatic force assisted deposition using a high strength electrostatic field of from 2 kV/cm to 10 kV/cm to form vertically standing nanosensors
   wherein an AFM probe is used to measure surface energy using a force map to track change of surface energy during the nanosensor deposition.

2. The method as recited in claim 1, wherein the low energy substrate comprises one or more polyolefins.

3. The method of claim 2, wherein the polyolefins are selected from the group consisting of LDPE, LLDPE, HDPE, PP, and PB.

4. The method as recited in claim 1, wherein the low energy substrate comprises one or more polyamides.

5. The method as recited in claim 4, wherein the polyamides are selected from the group consisting of Nylon6, Nylon6,6, Nylon6,10, Nylon6,11, and Kevlar.

6. The method as recited in claim 1, wherein the low energy substrate comprises one or more acrylics.

7. The method of claim 6, wherein the acrylics are selected from the group consisting of PMA, PMMA, and PEMA.

8. The method as recited in claim 1, wherein the low energy substrate comprises
   polyurethanes based on polyester polyols combined with aromatic or aliphatic isocyanates, and/or
   polyurethane based polyester polyols combined with aromatic or aliphatic isocyanates.

9. The method as recited in claim 1, wherein the low energy substrate comprises one or more vinyl polymers.

10. The method of claim 9, wherein the vinyl polymers are selected from the group consisting of PVC, EVA, PVA, and polyvinyledene chloride.

11. The method as recited in claim 1, wherein the low energy substrate comprises one or more styrene or styrene copolymers.

12. The method of claim 11, wherein the styrene or styrene copolymers are selected from the group consisting of PS, ABS, and SAN.

13. The method as recited in claim 1, wherein the low energy substrate is comprised of one or more fluoropolymers.

14. The method of claim 13, wherein the fluoropolymers are selected from the group consisting of PTFE and PVDF.

15. The method as recited in claim 1, wherein the low energy substrate comprises one or more silicones.

16. The method of claim 15 wherein the silicones are selected from the group consisting of polysiloxanes and RTV.

17. The method as recited in claim 1, wherein the low energy substrate comprises one or more Engineering Polymers selected from the group consisting of PEEK, PEK, polysulfones, and LCP.

18. The method as recited in claim 1, wherein the low energy substrate comprises one or more elastomers.

19. The method as recited in claim 18, wherein the elastomers are selected from the group consisting of natural rubber, polyisoprene, butyl rubber, polybutadiene, SBR, and polychloroprene.

20. The method as recited in claim 1, wherein the low energy substrate comprises interpenetrating polymeric networks.

21. The method as recited in claim 1, wherein the low energy substrate is stainless steel.

22. The method as recited in claim 1, wherein the low energy substrate is nickel titanium alloy.

23. The method as recited in claim 1, wherein the nanosensors are polymer nano structures.

24. The method as recited in claim 23, wherein the polymer nanostructures are embedded into a matrix polymer to form a yarn.

25. The method as recited in claim 24, wherein the yarn is a micro denier yarn.

26. The method as recited in claim 24, wherein the matrix polymer is dissolved to expose the polymer nanostructures.

27. The method as recited in claim 26, wherein the exposed polymer nanostructures are coated with a protective conformal coating film.

28. The method as recited in claim 25, wherein the polymer nanostructures are made of a polymer material selected from the group of polyesters consisting of polyethylene terephthalate, polyethylene naphthanate and polybutylene terephthalate.

29. The method as recited in claim 25, wherein the polymer nanostructures are made of a polyester and/or polyether based polyurethane.

30. The method as recited in claim 25, wherein the polymer nanostructures are comprised of polyolefins.

31. The method of claim 30 wherein the polyolefins include polypropylene.

32. The method as recited in claim 25, wherein the matrix polymer is made of a material selected from the group consisting of polystyrene, polyvinyl alcohol, ethylene vinyl alcohol, polyacrylamide and poly lactic acid.

33. The method as recited in claim 25, wherein the matrix polymer is made of a polyethylene terephthalate modified with sulfonated isocyanate.

34. The method as recited in claim 1, wherein the adhesive layer is a UV ink.

35. The method as recited in claim 1, wherein the adhesive layer is a UV glue.

36. The method as recited in claim 1, wherein the adhesive layer is a water based ink.

37. The method as recited in claim 1, wherein the adhesive layer is a water based glue.

38. The method as recited in claim 1, wherein the adhesive layer is a coating.

39. The method as recited in claim 1, wherein the adhesive layer is a solvent based ink.

40. The method of claim 1, wherein the step of applying the adhesive comprises applying the adhesive via screen printing.

* * * * *